US009838181B2

(12) United States Patent
Seo et al.

(10) Patent No.: US 9,838,181 B2
(45) Date of Patent: Dec. 5, 2017

(54) METHOD AND APPARATUS FOR ACQUIRING CONTROL INFORMATION IN WIRELESS COMMUNICATION SYSTEM

(71) Applicant: LG ELECTRONICS INC., Seoul (KR)

(72) Inventors: Inkwon Seo, Seoul (KR); Seungmin Lee, Seoul (KR); Hanbyul Seo, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 63 days.

(21) Appl. No.: 14/892,507

(22) PCT Filed: Jun. 26, 2014

(86) PCT No.: PCT/KR2014/005698
§ 371 (c)(1),
(2) Date: Nov. 19, 2015

(87) PCT Pub. No.: WO2014/209035
PCT Pub. Date: Dec. 31, 2014

(65) Prior Publication Data
US 2016/0112172 A1 Apr. 21, 2016

Related U.S. Application Data

(60) Provisional application No. 61/839,835, filed on Jun. 26, 2013, provisional application No. 61/843,436, filed on Jul. 7, 2013.

(51) Int. Cl.
*H04L 5/00* (2006.01)
*H04W 76/02* (2009.01)
(Continued)

(52) U.S. Cl.
CPC .......... *H04L 5/0053* (2013.01); *H04L 5/0064* (2013.01); *H04W 4/005* (2013.01);
(Continued)

(58) Field of Classification Search
CPC ... H04L 5/0051; H04L 5/0094; H04L 1/0046; H04L 1/0038; H04L 5/0007;
(Continued)

(56) References Cited

U.S. PATENT DOCUMENTS

2012/0327894 A1 12/2012 Axmon et al.
2013/0083753 A1* 4/2013 Lee ................... H04W 72/0453
370/329
(Continued)

FOREIGN PATENT DOCUMENTS

KR 10-2013-0043048 4/2013

OTHER PUBLICATIONS

PCT International Application No. PCT/KR2014/005698, Written Opinion of the International Searching Authority dated Oct. 10, 2014, 18 pages.
(Continued)

*Primary Examiner* — Ajay Cattungal
(74) *Attorney, Agent, or Firm* — Lee, Hong, Degerman, Kang & Waimey

(57) ABSTRACT

A method for acquiring control information by a device-to-device (D2D) terminal in a wireless communication system, according to one embodiment of the present invention, comprises the steps of: determining a resource region in which control information is transmitted on the basis of a D2D occupied bandwidth; and acquiring the control information from the resource region.

16 Claims, 13 Drawing Sheets

(51) Int. Cl.
*H04W 4/00* (2009.01)
*H04L 1/00* (2006.01)

(52) U.S. Cl.
CPC ......... *H04W 76/023* (2013.01); *H04L 1/0038* (2013.01); *H04L 1/0046* (2013.01); *H04L 5/0007* (2013.01); *H04L 5/0051* (2013.01); *H04L 5/0094* (2013.01)

(58) Field of Classification Search
CPC .... H04L 5/0064; H04L 5/0053; H04W 4/005; H04W 76/023
See application file for complete search history.

(56) References Cited

U.S. PATENT DOCUMENTS

| | | | |
|---|---|---|---|
| 2013/0100899 A1* | 4/2013 | Kim | H04W 28/16 370/329 |
| 2013/0114537 A1 | 5/2013 | Lee | |
| 2013/0155962 A1 | 6/2013 | Hakola et al. | |
| 2014/0293953 A1* | 10/2014 | Seo | H04L 5/0048 370/329 |
| 2014/0301336 A1* | 10/2014 | Kim | H04L 5/001 370/329 |
| 2014/0314036 A1* | 10/2014 | Takeda | H04L 5/0048 370/329 |
| 2015/0124737 A1* | 5/2015 | Lee | H04W 52/28 370/329 |
| 2015/0180616 A1* | 6/2015 | Lee | H04L 1/1812 370/329 |
| 2015/0264551 A1* | 9/2015 | Ko | H04W 8/005 370/329 |
| 2015/0312905 A1* | 10/2015 | Seo | H04B 7/2656 370/280 |
| 2015/0319597 A1* | 11/2015 | Lee | H04W 8/005 455/434 |
| 2016/0007374 A1* | 1/2016 | Lee | H04J 11/00 370/336 |

OTHER PUBLICATIONS

PCT International Application No. PCT/KR2014/005698, Written Opinion of the International Searching Authority dated Oct. 10, 2014, 12 pages.

European Patent Office Application Serial No. 14817469.1, Search Report dated Feb. 8, 2017, 9 pages.

Ericsson, "D2D for LTE Proximity Services: Overview", R1-132028, 3GPP TSG RAN WG1 Meeting #73, May 2013, 6 pages.

\* cited by examiner

FIG. 5
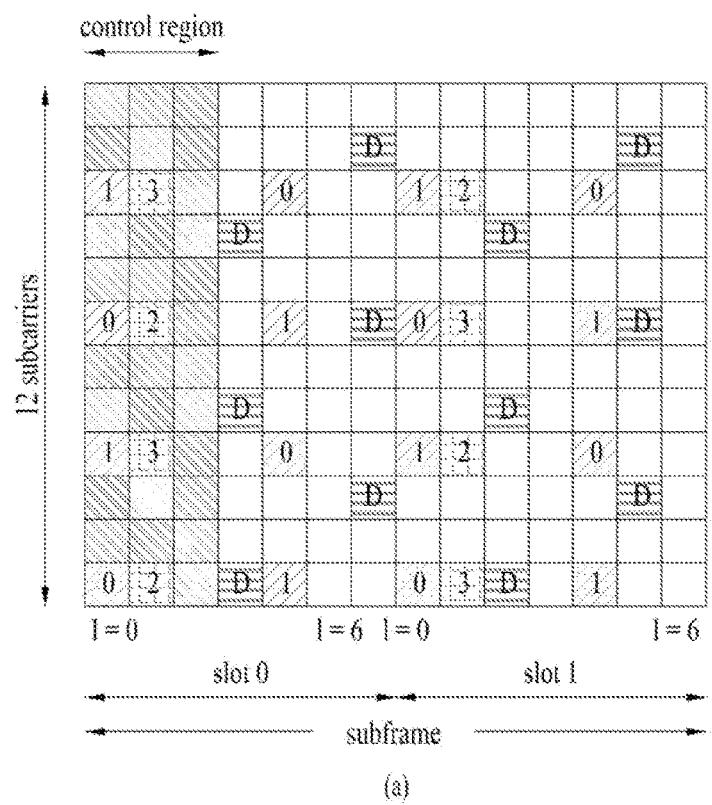
(a)
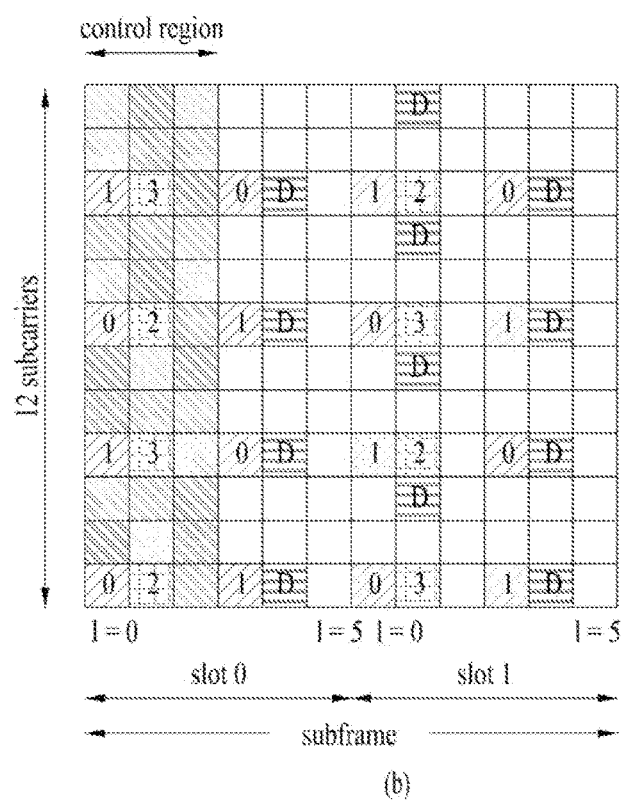
(b)

FIG. 7
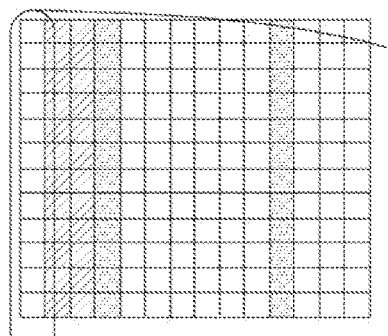
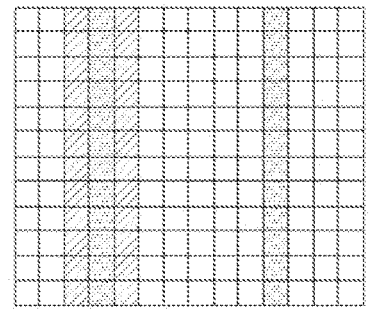
Blanking for TA (or unsynchronization)
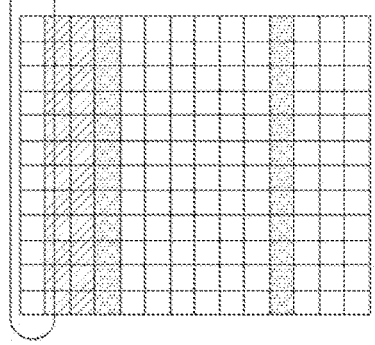
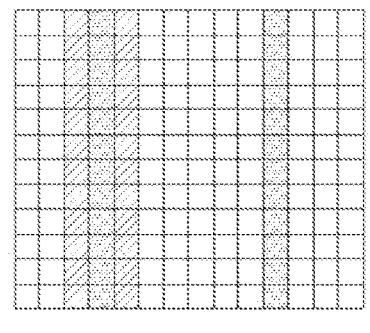
(a) allocation for early decoding  (b) allocation for channel estimation
▨ : resources transmitting control information   ▦ : DMRS : REs determined by RE set 4

: REs determined by RE set 5

: REs derived by moving RE set 6

| 35 | 23 | 11 |   | 11 | 23 | 35 | 35 | 23 | 11 |   | 11 | 23 | 35 |
|----|----|----|---|----|----|----|----|----|----|---|----|----|----|
| 33 | 21 | 9  |   | 9  | 21 | 33 | 33 | 21 | 9  |   | 9  | 21 | 33 |
| 31 | 19 | 7  |   | 7  | 19 | 31 | 31 | 19 | 7  |   | 7  | 19 | 31 |
| 29 | 17 | 5  |   | 5  | 17 | 29 | 29 | 17 | 5  |   | 5  | 17 | 29 |
| 27 | 15 | 3  |   | 3  | 15 | 27 | 27 | 15 | 3  |   | 3  | 15 | 27 |
| 25 | 13 | 1  |   | 1  | 13 | 25 | 25 | 13 | 1  |   | 1  | 13 | 25 |
| 26 | 14 | 2  |   | 2  | 14 | 26 | 26 | 14 | 2  |   | 2  | 14 | 26 |
| 28 | 16 | 4  |   | 4  | 16 | 28 | 28 | 16 | 4  |   | 4  | 16 | 28 |
| 30 | 18 | 6  |   | 6  | 18 | 30 | 30 | 18 | 6  |   | 6  | 18 | 30 |
| 32 | 20 | 8  |   | 8  | 20 | 32 | 32 | 20 | 8  |   | 8  | 20 | 32 |
| 34 | 22 | 10 |   | 10 | 22 | 34 | 34 | 22 | 10 |   | 10 | 22 | 34 |
| 36 | 24 | 12 |   | 12 | 24 | 36 | 36 | 24 | 12 |   | 12 | 24 | 36 |

: resources transmitting control information

US 9,838,181 B2

METHOD AND APPARATUS FOR ACQUIRING CONTROL INFORMATION IN WIRELESS COMMUNICATION SYSTEM

CROSS-REFERENCE TO RELATED APPLICATIONS

This application is the National Stage filing under 35 U.S.C. 371 of International Application No. PCT/KR2014/005698, filed on Jun. 26, 2014, which claims the benefit of U.S. Provisional Application No. 61/839,835, filed on Jun. 26, 2013, and 61/843,436, filed Jul. 7, 2013, the contents of which are all hereby incorporated by reference herein in their entirety.

TECHNICAL FIELD

Following description relates to a wireless communication, and more particularly, to a method of transmitting and receiving control information in device-to-device communication and an apparatus therefor.

BACKGROUND ART

Wireless communication systems are widely deployed to provide various kinds of communication content such as voice and data. Generally, these communication systems are multiple access systems capable of supporting communication with multiple users by sharing available system resources (e.g., bandwidth and transmit power). Examples of multiple access systems include a code division multiple access (CDMA) system, a frequency division multiple access (FDMA) system, a time division multiple access (TDMA) system, an orthogonal frequency division multiple access (OFDMA) system, a single carrier frequency-division multiple access (SC-FDMA) system, and a multi-carrier frequency division multiple access (MC-FDMA) system.

A device-to-device (hereinafter abbreviated D2D) communication corresponds to a communication scheme transmitting and receiving audio, data and the like between UEs without passing through an evolved Node B (hereinafter abbreviated eNB) by configuring a direct link between the UEs. The D2D communication can include such a communication scheme as a UE-to-UE communication scheme, a peer-to-peer communication scheme and the like. The D2D communication scheme can be applied to a M2M (machine-to-machine) communication, MTC (machine type communication) and the like.

The D2D communication is considered as a method of solving a burden of an eNB resulted from increasing data traffic. For instance, unlike a legacy wireless communication system, the D2D communication transmits and receives data between devices without passing through an eNB. Hence, the D2D communication can reduce network overload. Moreover, if the D2D communication is introduced, it may be able to expect reduced procedures of an eNB, reduced power consumption of devices participating in the D2D, increased data transmission speed, increased network capacity, load distribution, and enlarged a cell coverage and the like.

DISCLOSURE OF THE INVENTION

Technical Task

A technical task of the present invention is to provide a method of transmitting and receiving control information capable of minimizing complexity in D2D communication.

Technical tasks obtainable from the present invention are non-limited the above-mentioned technical task. And, other unmentioned technical tasks can be clearly understood from the following description by those having ordinary skill in the technical field to which the present invention pertains.

Technical Solution

To achieve these and other advantages and in accordance with the purpose of the present invention, as embodied and broadly described, according to a first technical aspect of the present invention, a method of obtaining control information, which is obtained by a D2D (device-to-device) user equipment in a wireless communication system, includes the steps of determining a resource region in which the control information is transmitted based on a D2D occupied bandwidth and obtaining the control information in the resource region.

To further achieve these and other advantages and in accordance with the purpose of the present invention, according to a second technical aspect of the present invention, a D2D (device-to-device) user equipment in a wireless communication system includes a reception module and a processor. In this case, the processor is configured to determine a resource region in which control information is transmitted and obtain the control information in the resource region based on a D2D occupied bandwidth, The first and the second technical aspect can include all or a part of items described in the following.

The step of determining the resource region in which the control information is transmitted can further include the steps of determining the number of RBs (resource blocks) in which the control information is transmitted and the number of REs in which the control information is transmitted in an RB in which the control information is transmitted based on the D2D occupied bandwidth and determining a position of an RB in which the control information is transmitted and a position of an RE in which the control information is transmitted in the RB in which the control information is transmitted based on the D2D occupied bandwidth.

The position of the RB in which the control information is transmitted can be determined based on the number of RBs configuring the D2D occupied bandwidth and the number of RBs in which the control information is transmitted, which are determined based on the D2D occupied bandwidth.

The position of the RB in which the control information is transmitted can be determined based on Equation in the following.

$$Y_i = \left\lfloor \frac{M}{N} \right\rfloor i + \left\lfloor \frac{M}{2N} \right\rfloor$$

The M may correspond to the number of RBs configuring the D2D occupied bandwidth and the N may correspond to the number of RBs in which the control information is transmitted, i=0, ..., N−1.

The position of the RE in which the control information is transmitted can be determined based on the number of REs in which the control information is transmitted, which are determined based on the D2D occupied bandwidth.

The position of the RE in which the control information is transmitted is determined according to an RE set corresponding to the number of REs in which the control information is transmitted and a position of an RE in which control information is transmitted can be determined in advance in an RB of the RE set.

If there is no RE set corresponding to the number of REs in which the control information is transmitted, the position of the RE in which the control information is transmitted can be determined by a combination of at least two or more RE sets.

The position of the RE in which the control information is transmitted may be not overlapped with each other in the at least two or more RE sets.

The position of the RE in which the control information is transmitted can be positioned on an OFDM symbol adjacent to an OFDM symbol, which is allocated to a demodulation reference signal, in the RE set.

A position of an RE in which the control information is transmitted can be determined by an index assigned to the RE in an RB.

A lowest index among the index can be positioned on an OFDM symbol adjacent to an OFDM symbol assigned to a demodulation reference signal.

The D2D occupied bandwidth may correspond to a bandwidth signaled by one of a base station and a cluster head user equipment.

Advantageous Effects

According to the present invention, it is able to efficiently transmit and receive control information in D2D communication.

Effects obtainable from the present invention may be non-limited by the above mentioned effect. And, other unmentioned effects can be clearly understood from the following description by those having ordinary skill in the technical field to which the present invention pertains.

DESCRIPTION OF DRAWINGS

The accompanying drawings, which are included to provide a further understanding of the invention and are incorporated in and constitute a part of this specification, illustrate embodiments of the invention and together with the description serve to explain the principles of the invention.

FIG. 5 is a diagram for explaining a reference signal;

FIGS. 6 to 14 are diagrams for explaining a resource for transmitting control information according to each embodiment of the present invention;

BEST MODE

Mode for Invention

Figure 1:
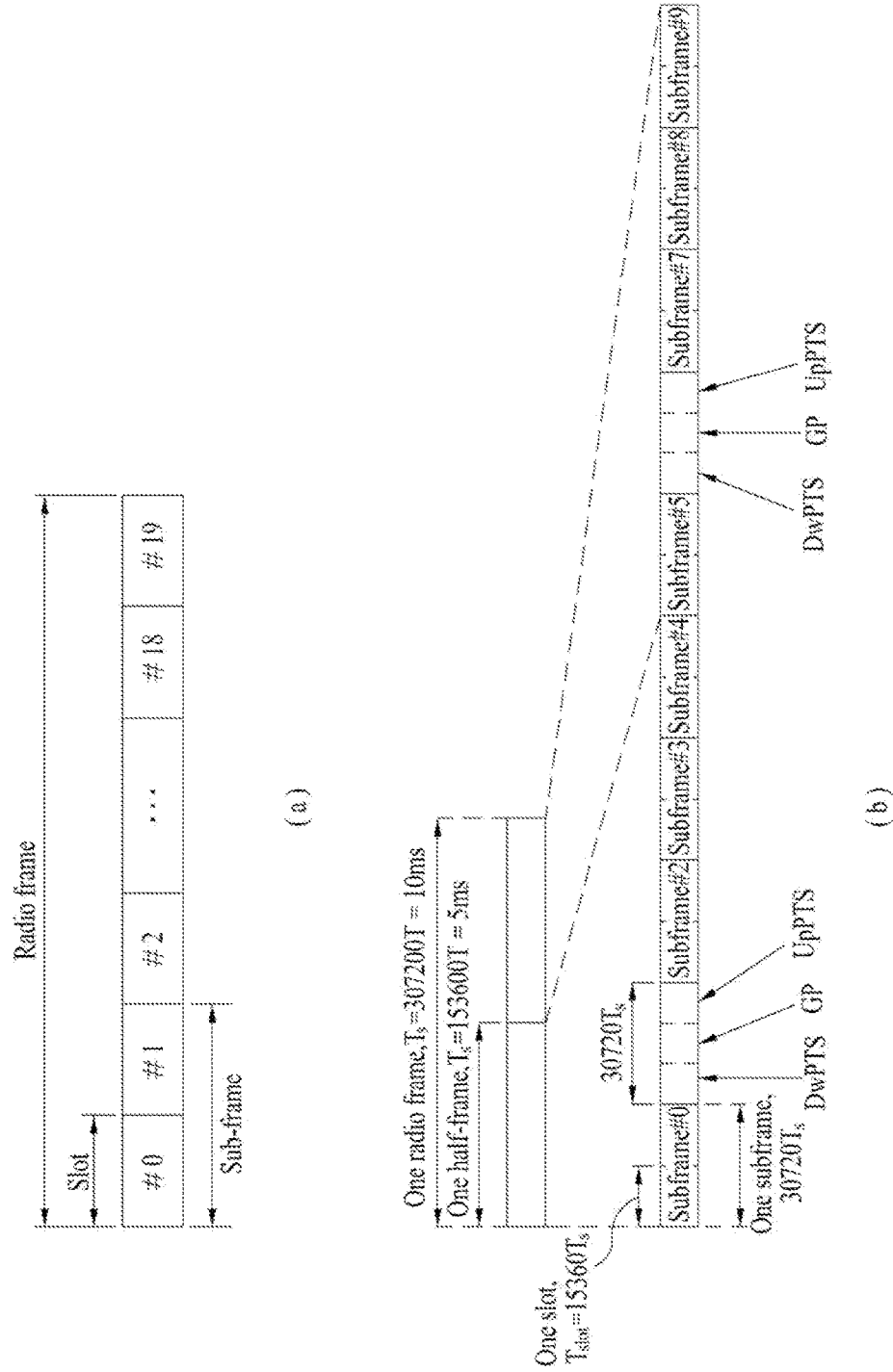
FIG. 1 is a diagram for a structure of a radio frame.

The embodiments of the present invention described hereinbelow are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions or features of any one embodiment may be included in another embodiment and may be replaced with corresponding constructions or features of another embodiment.

In the embodiments of the present invention, a description is made, centering on a data transmission and reception relationship between a Base Station (BS) and a User Equipment (UE). The BS is a terminal node of a network, which communicates directly with a UE. In some cases, a specific operation described as performed by the BS may be performed by an upper node of the BS.

Namely, it is apparent that, in a network comprised of a plurality of network nodes including a BS, various operations performed for communication with a UE may be performed by the BS or network nodes other than the BS. The term 'BS' may be replaced with the term 'fixed station', 'Node B', 'evolved Node B (eNode B or eNB)', 'Access Point (AP)', etc. The term 'relay' may be replaced with the term 'Relay Node (RN)' or 'Relay Station (RS)'. The term 'terminal' may be replaced with the term 'UE', 'Mobile Station (MS)', 'Mobile Subscriber Station (MSS)', 'Subscriber Station (SS)', etc.

Specific terms used for the embodiments of the present invention are provided to help the understanding of the present invention. These specific terms may be replaced with other terms within the scope and spirit of the present invention.

In some cases, to prevent the concept of the present invention from being ambiguous, structures and apparatuses of the known art will be omitted, or will be shown in the form of a block diagram based on main functions of each structure and apparatus. Also, wherever possible, the same reference numbers will be used throughout the drawings and the specification to refer to the same or like parts.

The embodiments of the present invention can be supported by standard documents disclosed for at least one of wireless access systems, Institute of Electrical and Electronics Engineers (IEEE) 802, 3rd Generation Partnership Project (3GPP), 3GPP Long Term Evolution (3GPP LTE), LTE-Advanced (LTE-A), and 3GPP2. Steps or parts that are not described to clarify the technical features of the present invention can be supported by those documents. Further, all terms as set forth herein can be explained by the standard documents.

Techniques described herein can be used in various wireless access systems such as Code Division Multiple Access (CDMA), Frequency Division Multiple Access (FDMA), Time Division Multiple Access (TDMA), Orthogonal Frequency Division Multiple Access (OFDMA), Single Carrier-Frequency Division Multiple Access (SC-FDMA), etc. CDMA may be implemented as a radio technology such as Universal Terrestrial Radio Access (UTRA) or CDMA2000. TDMA may be implemented as a radio technology such as Global System for Mobile communications (GSM)/General Packet Radio Service (GPRS)/Enhanced Data Rates for GSM Evolution (EDGE). OFDMA may be implemented as a radio technology such as IEEE 802.11 (Wi-Fi), IEEE 802.16 (WiMAX), IEEE 802.20, Evolved-UTRA (E-UTRA) etc. UTRA is a part of Universal Mobile Telecommunications System (UMTS). 3GPP LTE is a part of Evolved UMTS (E-UMTS) using E-UTRA. 3GPP LTE employs OFDMA for downlink and SC-FDMA for uplink. LTE-A is an evolution of 3GPP LTE. WiMAX can be described by the IEEE 802.16e standard (Wireless Metropolitan Area Network (WirelessMAN)-OFDMA Reference System) and the IEEE 802.16m standard (WirelessMAN-OFDMA Advanced System). For clarity, this application focuses on the 3GPP LTE and LTE-A systems. However, the technical features of the present invention are not limited thereto.

LTE/LTE-A Resource Structure/Channel

With reference to FIG. 1, the structure of a radio frame will be described below.

In a cellular Orthogonal Frequency Division Multiplexing (OFDM) wireless packet communication system, uplink and/or downlink data packets are transmitted in subframes. One subframe is defined as a predetermined time period including a plurality of OFDM symbols. The 3GPP LTE standard supports a type-1 radio frame structure applicable to Frequency Division Duplex (FDD) and a type-2 radio frame structure applicable to Time Division Duplex (TDD).

FIG. 1(a) illustrates the type-1 radio frame structure. A downlink radio frame is divided into 10 subframes. Each subframe is further divided into two slots in the time domain. A unit time during which one subframe is transmitted is defined as a Transmission Time Interval (TTI). For example, one subframe may be 1 ms in duration and one slot may be 0.5 ms in duration. A slot includes a plurality of OFDM symbols in the time domain and a plurality of Resource Blocks (RBs) in the frequency domain. Because the 3GPP LTE system adopts OFDMA for downlink, an OFDM symbol represents one symbol period. An OFDM symbol may be referred to as an SC-FDMA symbol or symbol period. An RB is a resource allocation unit including a plurality of contiguous subcarriers in a slot.

The number of OFDM symbols in one slot may vary depending on a Cyclic Prefix (CP) configuration. There are two types of CPs: extended CP and normal CP. In the case of the normal CP, one slot includes 7 OFDM symbols. In the case of the extended CP, the length of one OFDM symbol is increased and thus the number of OFDM symbols in a slot is smaller than in the case of the normal CP. Thus when the extended CP is used, for example, 6 OFDM symbols may be included in one slot. If channel state gets poor, for example, during fast movement of a UE, the extended CP may be used to further decrease Inter-Symbol Interference (ISI).

In the case of the normal CP, one subframe includes 14 OFDM symbols because one slot includes 7 OFDM symbols. The first two or three OFDM symbols of each subframe may be allocated to a Physical Downlink Control CHannel (PDCCH) and the other OFDM symbols may be allocated to a Physical Downlink Shared Channel (PDSCH).

FIG. 1(b) illustrates the type-2 radio frame structure. A type-2 radio frame includes two half frames, each having 5 subframes, a Downlink Pilot Time Slot (DwPTS), a Guard Period (GP), and an Uplink Pilot Time Slot (UpPTS). Each subframe is divided into two slots. The DwPTS is used for initial cell search, synchronization, or channel estimation at a UE. The UpPTS is used for channel estimation and acquisition of uplink transmission synchronization to a UE at an eNB. The GP is a period between an uplink and a downlink, which eliminates uplink interference caused by multipath delay of a downlink signal. One subframe includes two slots irrespective of the type of a radio frame.

The above-described radio frame structures are purely exemplary and thus it is to be noted that the number of subframes in a radio frame, the number of slots in a subframe, or the number of symbols in a slot may vary.

Figure 2:
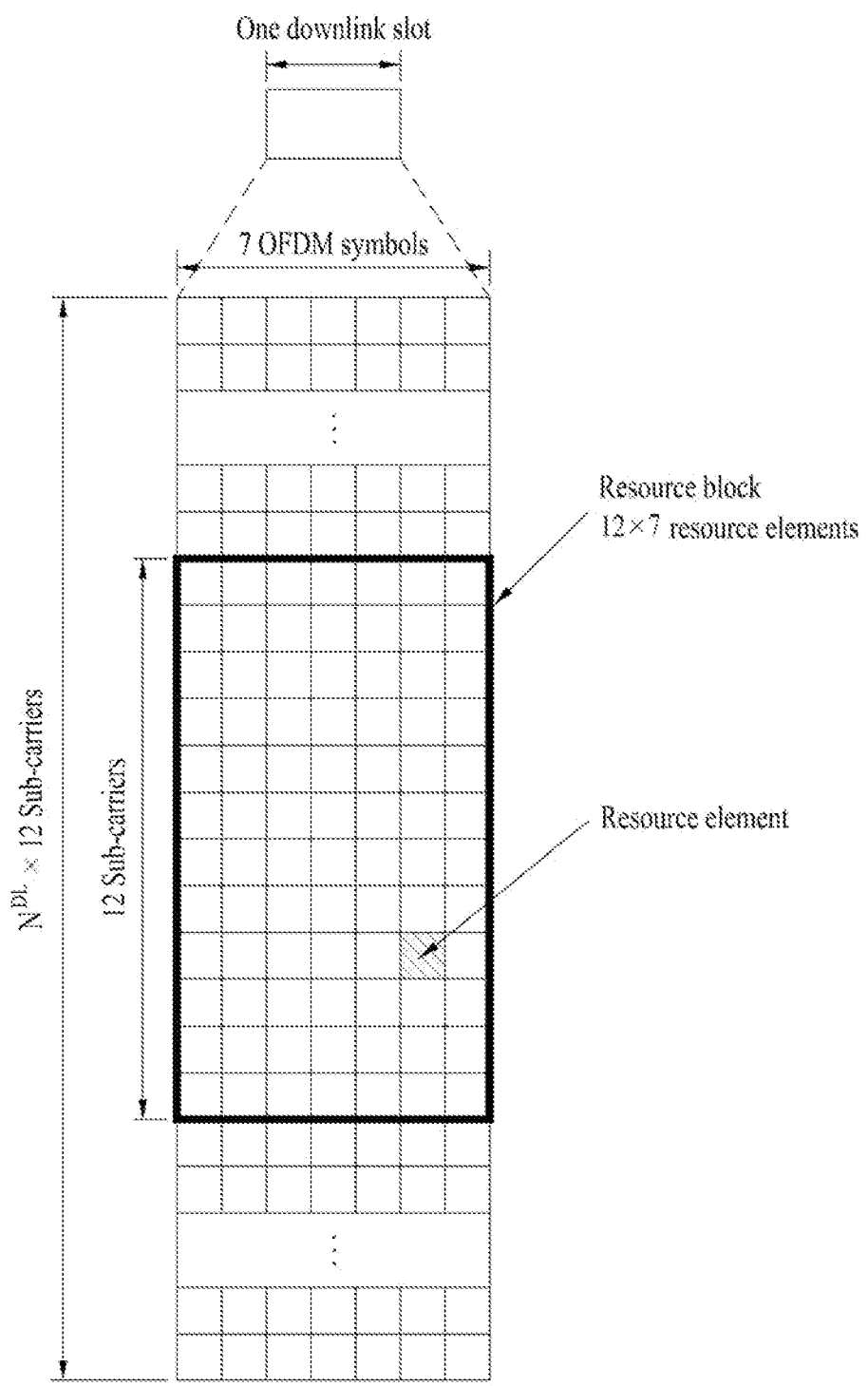
FIG. 2 is a diagram for a resource grid in downlink slot.

FIG. 2 illustrates the structure of a downlink resource grid for the duration of one downlink slot. A downlink slot includes 7 OFDM symbols in the time domain and an RB includes 12 subcarriers in the frequency domain, which does not limit the scope and spirit of the present invention. For example, a downlink slot may include 7 OFDM symbols in the case of the normal CP, whereas a downlink slot may include 6 OFDM symbols in the case of the extended CP. Each element of the resource grid is referred to as a Resource Element (RE). An RB includes 12×7 REs. The number of RBs in a downlink slot, NDL depends on a downlink transmission bandwidth. An uplink slot may have the same structure as a downlink slot.

Figure 3:
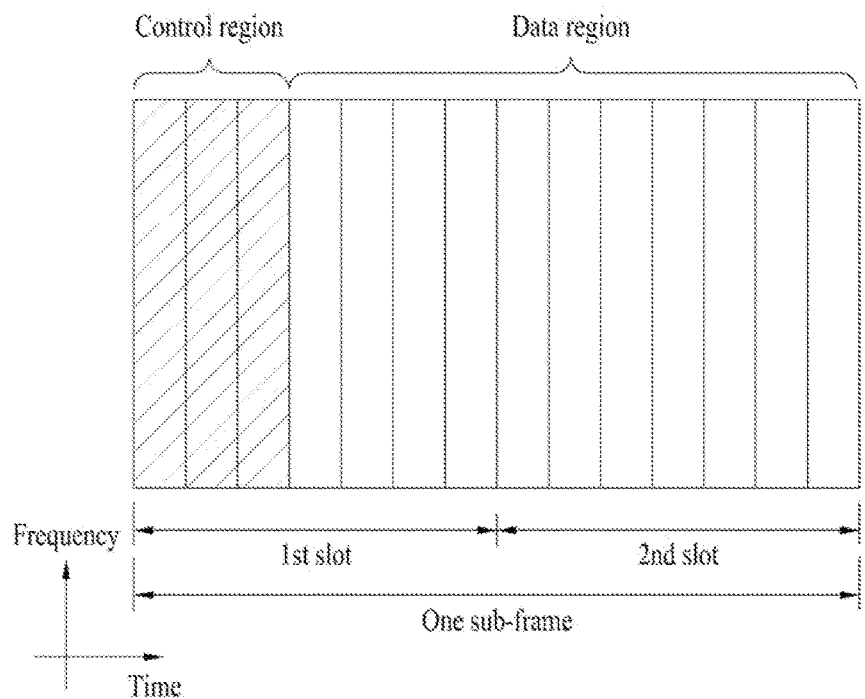
FIG. 3 is a diagram for a structure of a downlink subframe.

FIG. 3 illustrates the structure of a downlink subframe. Up to three OFDM symbols at the start of the first slot in a downlink subframe are used for a control region to which control channels are allocated and the other OFDM symbols of the downlink subframe are used for a data region to which a PDSCH is allocated. Downlink control channels used in the 3GPP LTE system include a Physical Control Format Indicator CHannel (PCFICH), a Physical Downlink Control CHannel (PDCCH), and a Physical Hybrid automatic repeat request (HARQ) Indicator CHannel (PHICH). The PCFICH is located in the first OFDM symbol of a subframe, carrying information about the number of OFDM symbols used for transmission of control channels in the subframe. The PHICH delivers an HARQ ACKnowledgment/Negative ACKnowledgment (ACK/NACK) signal in response to an uplink transmission. Control information carried on the PDCCH is called Downlink Control Information (DCI). The DCI transports uplink or downlink scheduling information, or uplink transmission power control commands for UE groups. The PDCCH delivers information about resource allocation and a transport format for a Downlink Shared CHannel (DL-SCH), resource allocation information about an Uplink Shared CHannel (UL-SCH), paging information of a Paging CHannel (PCH), system information on the DL-SCH, information about resource allocation for a higher-layer control message such as a Random Access Response transmitted on the PDSCH, a set of transmission power control commands for individual UEs of a UE group, transmission power control information, Voice Over Internet Protocol (VoIP) activation information, etc. A plurality of PDCCHs may be transmitted in the control region. A UE may monitor a plurality of PDCCHs. A PDCCH is formed by aggregating one or more consecutive Control Channel Elements (CCEs). A CCE is a logical allocation unit used to provide a PDCCH at a coding rate based on the state of a radio channel. A CCE includes a plurality of RE groups. The format of a PDCCH and the number of available bits for the PDCCH are determined according to the correlation between the number of CCEs and a coding rate provided by the CCEs. An eNB determines the PDCCH format according to DCI transmitted to a UE and adds a Cyclic Redundancy Check (CRC) to control information. The CRC is masked by an Identifier (ID) known as a Radio Network Temporary Identifier (RNTI) according to the owner or usage of the PDCCH. If the PDCCH is directed to a specific UE, its CRC may be masked by a cell-RNTI (C-RNTI) of the UE. If the PDCCH is for a paging message, the CRC of the PDCCH may be masked by a Paging Indicator Identifier (P-RNTI). If the PDCCH carries system information, particularly, a System Information Block (SIB), its CRC may be masked by a system information ID and a System Information RNTI (SI-RNTI). To indicate that the PDCCH carries a Random Access Response in response to a Random Access Preamble transmitted by a UE, its CRC may be masked by a Random Access-RNTI (RA-RNTI).

Figure 4:
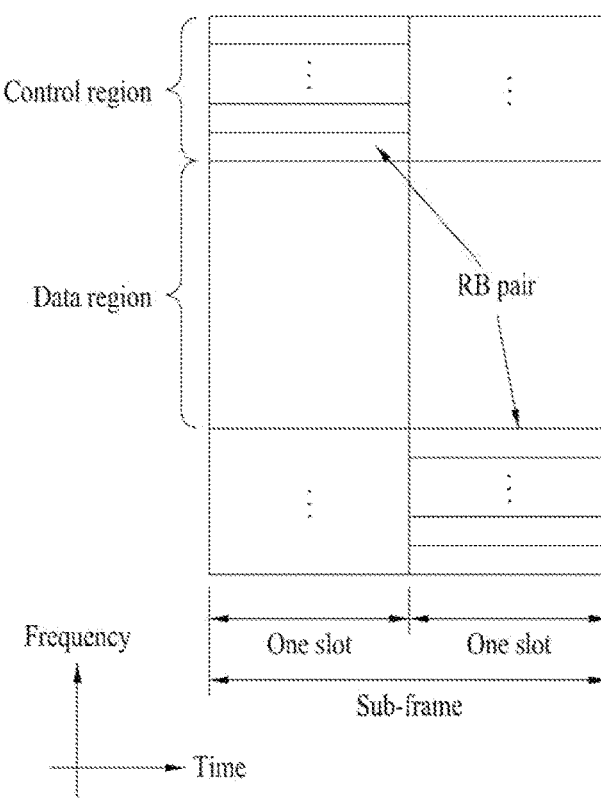
FIG. 4 is a diagram for a structure of an uplink subframe.

FIG. 4 illustrates the structure of an uplink subframe. An uplink subframe may be divided into a control region and a data region in the frequency domain. A Physical Uplink Control CHannel (PUCCH) carrying uplink control information is allocated to the control region and a Physical Uplink Shared Channel (PUSCH) carrying user data is allocated to the data region. To maintain the property of a single carrier, a UE does not transmit a PUSCH and a PUCCH simultaneously. A PUCCH for a UE is allocated to an RB pair in a subframe. The RBs of the RB pair occupy different subcarriers in two slots. Thus it is said that the RB pair allocated to the PUCCH is frequency-hopped over a slot boundary.

Reference Signals (RSs)

In a wireless communication system, a packet is transmitted on a radio channel. In view of the nature of the radio channel, the packet may be distorted during the transmission. To receive the signal successfully, a receiver should compensate for the distortion of the received signal using channel information. Generally, to enable the receiver to acquire the channel information, a transmitter transmits a signal known to both the transmitter and the receiver and the receiver acquires knowledge of channel information based on the distortion of the signal received on the radio channel. This signal is called a pilot signal or an RS.

In the case of data transmission and reception through multiple antennas, knowledge of channel states between Transmission (Tx) antennas and Reception (Rx) antennas is required for successful signal reception. Accordingly, an RS should be transmitted through each Tx antenna.

RSs may be divided into downlink RSs and uplink RSs. In the current LTE system, the uplink RSs include:

i) DeModulation-Reference Signal (DM-RS) used for channel estimation for coherent demodulation of information delivered on a PUSCH and a PUCCH; and ii) Sounding Reference Signal (SRS) used for an eNB or a network to measure the quality of an uplink channel in a different frequency.

The downlink RSs are categorized into:

i) Cell-specific Reference Signal (CRS) shared among all UEs of a cell;

ii) UE-specific RS dedicated to a specific UE;

iii) DM-RS used for coherent demodulation of a PDSCH, when the PDSCH is transmitted;

iv) Channel State Information-Reference Signal (CSI-RS) carrying CSI, when downlink DM-RSs are transmitted;

v) Multimedia Broadcast Single Frequency Network (MBSFN) RS used for coherent demodulation of a signal transmitted in MBSFN mode; and vi) positioning RS used to estimate geographical position information about a UE.

RSs may also be divided into two types according to their purposes: RS for channel information acquisition and RS for data demodulation. Since its purpose lies in that a UE acquires downlink channel information, the former should be transmitted in a broad band and received even by a UE that does not receive downlink data in a specific subframe. This RS is also used in a situation like handover. The latter is an RS that an eNB transmits along with downlink data in specific resources. A UE can demodulate the data by measuring a channel using the RS. This RS should be transmitted in a data transmission area.

CRSs serve two purposes, that is, channel information acquisition and data demodulation. A UE-specific RS is used only for data demodulation. CRSs are transmitted in every subframe in a broad band and CRSs for up to four antenna ports are transmitted according to the number of Tx antennas in an eNB.

For example, if the eNB has two Tx antennas, CRSs for antenna ports 0 and 1 are transmitted. In the case of four Tx antennas, CRSs for antenna ports 0 to 3 are respectively transmitted.

FIG. 5 illustrates patterns in which CRSs and DRSs are mapped to a downlink RB pair, as defined in a legacy 3GPP LTE system (e.g. conforming to Release-8). An RS mapping unit, i.e. a downlink RB pair may include one subframe in time by 12 subcarriers in frequency. That is, an RB pair includes 14 OFDM symbols in time in the case of the normal CP (see FIG. 5(a)) and 12 OFDM symbols in time in the case of the extended CP (see FIG. 5(b)).

In FIG. 5, the positions of RSs in an RB pair for a system where an eNB supports four Tx antennas are illustrated. Reference numerals 0, 1, 2 and 3 denote the REs of CRSs for first to fourth antenna ports, antenna port 0 to antenna port 3, respectively, and reference character 'D' denotes the positions of DRSs.

In the following, methods (methods of multiplexing data and control information in a D2D operation) of allocating a resource in which control information is transmitted are explained according to embodiments of the present invention. In case of a legacy LTE system, since control information is received by a plurality of UEs, each of a plurality of the UEs determines whether or not there exists control information transmitted to the UE by performing blind decoding on a given region (e.g., PDCCH symbol indicated by PCFICH) when PDCCH/EPDCCH is received. Yet, in case of a D2D operation, it may be preferable to transmit control information to a designated position to reduce decoding complexity of a UE. (Complexity of a D2D Tx UE may also become a problem. For example, when control information is transmitted to a common area, since it is necessary to additionally control a resource use (for control information transmission) between surrounding D2D pairs or perform scheduling by a base station (or header UE), it is preferable for each D2D Tx UE to transmit control information to a certain area of a resource used by the D2D Tx UE.) Hence, embodiments of the present invention described in the following propose methods of transmitting and receiving control information on a D2D operation in a specific frequency domain of a given D2D bandwidth (i.e., D2D occupied bandwidth). In the following description, all resources in which a base station (or a cluster head) performs D2D control can be called a D2D system bandwidth (D2D system bandwidth). A D2D occupied bandwidth may correspond to a bandwidth assigned to a specific D2D device/UE (pair) in the D2D system bandwidth. For example, there may exist a D2D system bandwidth of 10 MHz and the D2D system bandwidth can be used by a plurality of D2D pairs for D2D communication of each of a plurality of the D2D pairs in a manner of being divided. In this case, a resource region used by a D2D pair may correspond to a D2D occupied bandwidth of the D2D pair. A D2D occupied bandwidth may correspond to the whole of a D2D system bandwidth or a partial frequency resource (set) of the D2D system bandwidth. And, in the following description, although an uplink demodulation reference signal is representatively used as a reference signal, it is apparent that embodiments of the present invention can also be applied with an identical/similar logic when a reference signal of a different form/type is used.

Embodiment 1

Figure 6:
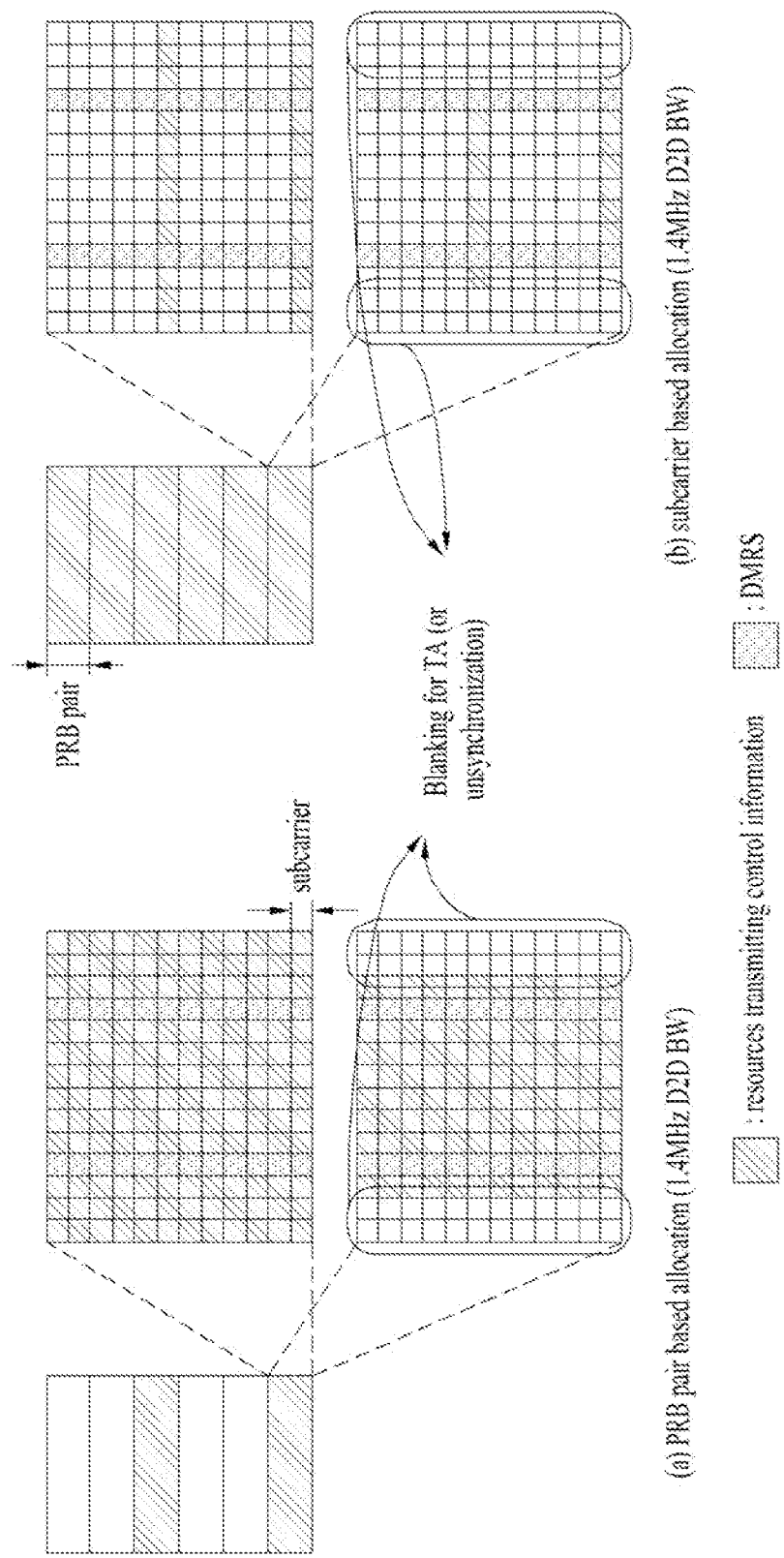

FIG. 6 shows an example of a resource region in which D2D control information is transmitted according to a first embodiment of the present invention. In FIG. 6, assume that a D2D occupied bandwidth corresponds to 1.4 MHz (6 PRB pairs) and backslashes of a rectangle in a PRB pair unit indicates that control information is transmitted to a corresponding PRB pair. And, in FIG. 6 (a) and FIG. 6 (b), a part represented as 'Blanking for TA' indicates that a corresponding symbol(s) may be restricted to be used as a control signal due to timing offset, sync discordance and the like.

FIG. 6 (a) and FIG. 6 (b) show PBR pair based allocation and subcarrier based allocation, respectively. The PRB pair based allocation of FIG. 6 (a) allocates a resource in a PRB pair unit to transmit control information and may indicate that all available resources (remaining resources except such a predetermined resource of a different usage as a RS, a gap and the like) of a corresponding PRB pair are used for transmitting and receiving control information. The PRB pair based allocation can be interpreted as a localized control signal and the PRB based allocation is helpful when beamforming is used in D2D. As shown in FIG. 6 (a), the number of PRB pairs and/or a position of a PRB pair used for a control signal in the PRB pair based allocation can be determined according to an amount of resources necessary for the control signal (In this case, resource overhead of the control signal for D2D can be determined in advance. The resource overhead of the control signal can be defined in advance by a single size or a plurality of resource overhead sizes. If many sizes are defined, the control signal can be decoded by blind decoding of a UE.), the number of resources in which the control signal is not transmitted and/or a D2D bandwidth (i.e., a D2D occupied bandwidth), and the like. This can also be interpreted as follows according to a unit (e.g., RE level, subcarrier level, PRB pair level, etc.) of a resource necessary for the control signal. For example, if a resource necessary for the control signal is defined in advance in a PRB pair unit, since the number of PRB pairs and resource overhead of the control signal are fixed, a coding rate of the control signal can be determined according to an amount of resources to which the control signal is not mapped. If a D2D bandwidth (i.e., a D2D occupied bandwidth) is wide, resources provided for frequency diversity can be distributed according to a (predetermined) specific rule.

As shown in FIG. 6 (a), if there are two or more RBs in which a control signal is transmitted, an interval (offset) between RBs in which the control signal is transmitted can be obtained in a manner of dividing the number of RBs corresponding to a D2D occupied bandwidth by the number of RBs in which the control signal is transmitted (by applying floor or ceiling). And, if PRB pairs in which a control signal is transmitted are contiguously positioned, a receiving device may assume PRB bundling. (In particular, when a UE decodes a plurality of PRB pairs in which a control signal is transmitted, the UE can assume identical precoding.)

FIG. 6 (b) can be comprehended as a distributed type control signal. Referring to FIG. 6 (b), it is able to see that an offset is applied between subcarriers on which a D2D control signal is transmitted. The offset can be obtained in a manner of dividing the number of subcarriers belonging to a total bandwidth (i.e., a D2D occupied bandwidth) by the number of subcarriers necessary for a control signal (by applying floor or ceiling). Since the D2D control signal is transmitted in a form to which the offset is applied, it is able to gain a frequency diversity effect.

Although FIG. 6 (b) shows an example that mapping is initiated from a start subcarrier of each RB, a subcarrier on which a control signal is transmitted may be located at a center part of a PRB pair. For example, the subcarrier on which the control signal is transmitted can be located at a $4^{th}$ and an $8^{th}$ subcarrier. (Or, a PRB pair transmitting a control signal may be able to determine a number and a position of subcarriers on which the control signal is transmitted in advance.) In particular, an interval between subcarriers on which the control signal is transmitted can be determined in a manner of being interlocked with an amount of resource of the control signal and a D2D bandwidth (i.e., D2D occupied bandwidth). In this case, if the amount of resource of the control signal is fixed, the interval between the subcarriers can be determined by the D2D bandwidth (i.e., D2D occupied bandwidth). And, in case of FIG. 6 (b), the subcarrier bases allocation can be extended to RE based allocation. In this case, it is able to induce spacing between REs used for a control signal in a manner of dividing the number of REs belonging to a D2D occupied bandwidth by the number of REs necessary for the control signal (by applying floor or ceiling).

FIG. 6 (a) and FIG. 6 (b) can be used in a combined form. In particular, RBs in which a control signal is transmitted are determined by a method explained in FIG. 6 (a) and a part (e.g., subcarriers) of the determined RBs can be used for transmitting the control signal.

Or, either FIG. 6 (a) or FIG. 6 (b) can be selectively used based on feedback (feedback on a control signal format) received from a reception device or a channel estimation result received from the reception device. In this case, information on which scheme is to be used among FIG. 6 (a) and FIG. 6 (b) can be included in control information. Or, a D2D device can identify which scheme is to be used among FIG. 6 (a) and FIG. 6 (b) by performing blind decoding.

Although the aforementioned description are explained on the premise a case that an amount of resources necessary for a control signal is fixed (in advance) (fixed aggregation level), a candidate concept can be applied in consideration of a channel status and the like. For example, two types of coding rate (1/2 and 1/4) can be applied. A reception UE can perform blind decoding on the two types of coding rate. (Although blind decoding is configured to be performed on a plurality of candidates according to each aggregation level on legacy PDCCH, EPDCCH and the like, it may be interpreted as blind decoding is performed on a single candidate only or (if there exist a plurality of coding rates) a single candidate according to each aggregation level in a D2D control signal.) As an example, if there exist two candidates of a coding rate 1/2 and a coding rate 1/4, a UE is able to know a position of a resource and an amount of the resource in which a control signal is transmitted when the coding rate corresponds to 1/2 and the UE is able to know a position of a resource and an amount of the resource in which a control signal is transmitted when the coding rate corresponds to 1/4 based on the aforementioned descriptions. Subsequently, the UE performs blind decoding on a candidate region according to each coding rate and may be then able to assume that a control signal is transmitted in a region where decoding is succeeded.

Embodiment 2

A region in which D2D control information is transmitted can be determined in an OFDM symbol unit. In particular, the control information can be transmitted via a specific OFDM symbol in the whole of a D2D bandwidth. In this case, a D2D bandwidth may correspond to a resource permitted to all D2D pairs or a resource region allocated for a D2D operation of a D2D pair among resources capable of being used for the purpose of D2D. The D2D bandwidth may bring out such a gain as early decoding of a control signal, channel estimation performance improvement and the like.

FIG. 7 shows examples of embodiment 2. Specifically, referring to FIG. 7 (a), early decoding of control information can be achieved in a manner of determining an OFDM symbol in which the control information is transmitted by a second and a third OFDM symbol. (Assume that a first OFDM symbol is not used for the purpose of transmitting control information.) According to the example of FIG. 7 (a), although two OFDM symbols are used for transmitting control information, the number of symbols may vary according to a D2D occupied bandwidth. (To this end, a reference configuration can be defined in advance. For example, if it is predefined that 1 OFDM symbol (e.g., if there is no RE to perform control signal rate matching in a corresponding OFDM symbol, an amount of resources corresponding to 120 REs) is assigned for a control signal in a bandwidth of 10 PRB pairs, 2 OFDM symbols can be used for a control signal in a bandwidth of 5 RBs.)

FIG. 7 (b) shows an example of using an OFDM symbol adjacent to a reference signal for transmitting a control signal to enhance channel estimation performance for the control signal. Although it is depicted as a control signal is transmitted to a position near a first DMRS to obtain an early decoding effect for the control signal, a control signal may be located at a position near a second DMRS. If there are two OFDM symbols transmitting a control signal, the control signal can be transmitted from a next OFDM symbol of an OFDM symbol in which a first DMRS is transmitted and a previous OFDM symbol of an OFDM symbol in which a second DMRS is transmitted.

Figure 8:
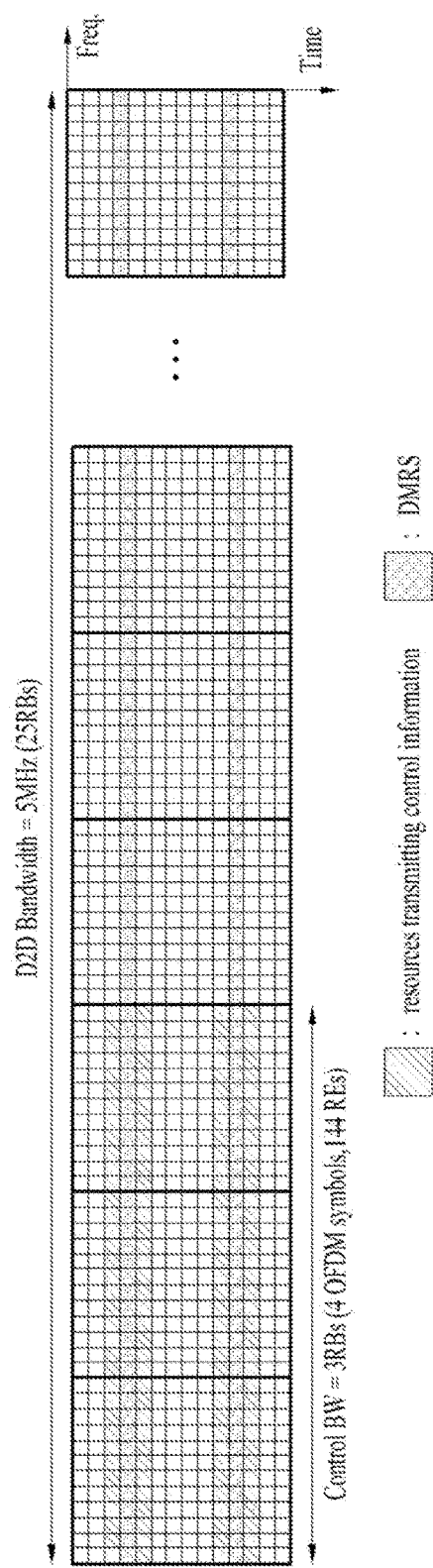

If a D2D bandwidth is wide, allocation in an OFDM symbol unit may cause resource waste. Hence, as shown in FIG. 8, control information can be transmitted in OFDM symbols of a part of RBs. In FIG. 8, it is assumed that a D2D control signal has a size of 144 REs. If a D2D occupied bandwidth corresponds to 5 MHz, as shown in the drawing, a control signal can be transmitted via OFDM symbols of 3 PRB pairs contiguous from a PRB pair of which an RB index is lowest (i.e., a start PRB pair of a D2D BW (i.e., D2D occupied bandwidth)). If 6 RBs are used for transmitting a control signal, it may use 2 OFDM symbols only.

Unlike what is shown in the drawing, RBs in which a control signal is transmitted can be distributed in frequency domain (with 8 PRB pairs spacing in frequency domain). The spacing can be determined according to a D2D occupied bandwidth. And, although FIG. 8 is depicted as a control signal is mapped from an RB of a lowest index, a start position of the control signal can be determined by a specific offset and the specific offset can be determined in advance (e.g., the start position is located at the center of a D2D bandwidth) or can be determined in a manner of being associated with an ID of a D2D pair (or dTUE or dRUE).

Figure 9:
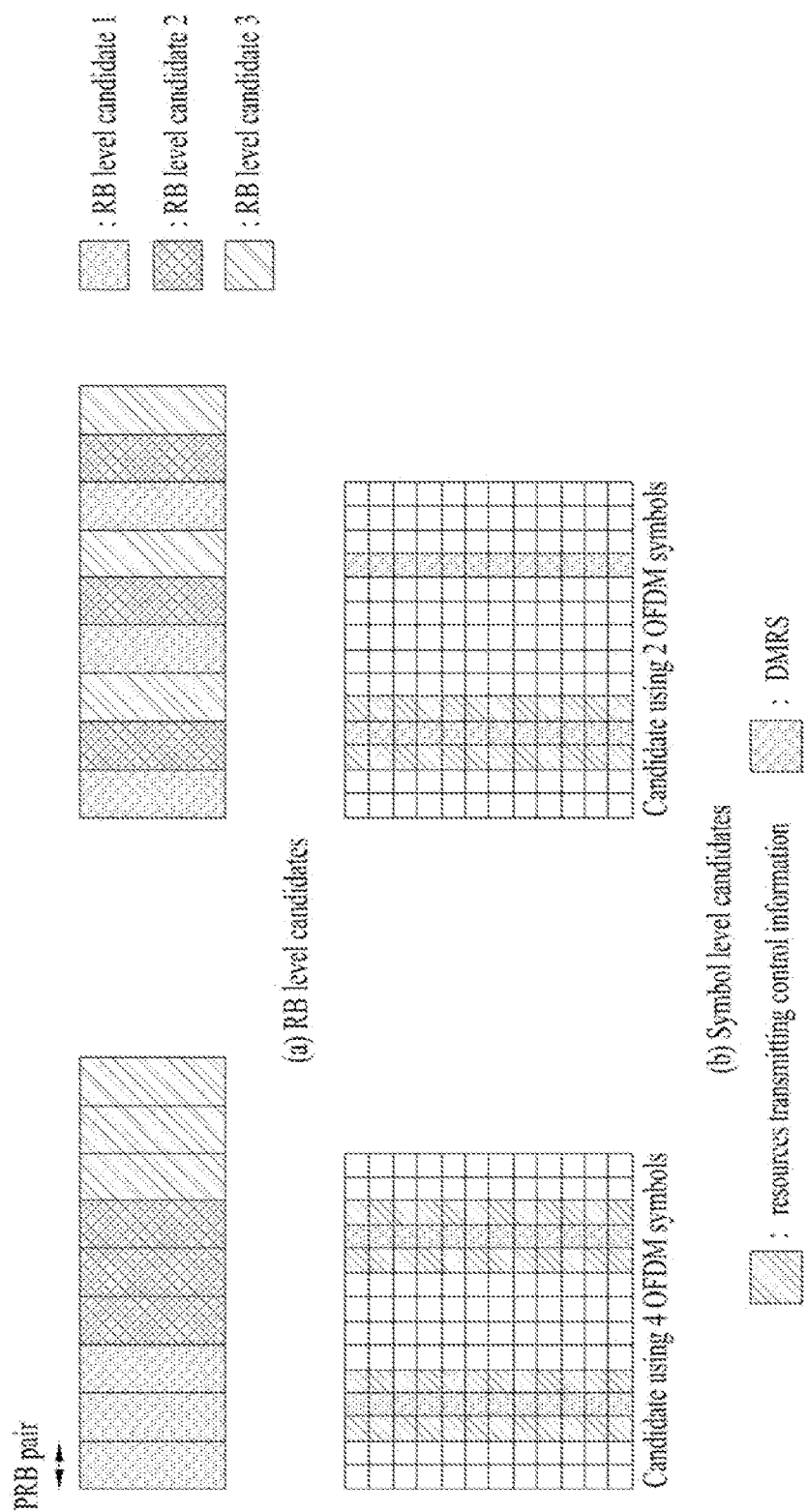

FIG. 9 shows an example for a case of using a D2D bandwidth used for transmitting a control signal in a manner that pluralities of UEs divide the D2D bandwidth up. (This may indicate a case that a control signal of D2D pairs belonging to a D2D system is transmitted in a specific region of a D2D system bandwidth only.) In this case, the control signal can be received by performing blind decoding on a resource candidate in which the control signal is transmitted. In this case, as shown in the drawing, the resource candidate may correspond to an RB level (FIG. 9 (a)) candidate or, as shown in FIG. 9 (b), the resource candidate may correspond to one of two symbol level candidates. Hence, in FIG. 9, a UE can decode a control signal transmitted to the UE by performing total 6 times of blind decoding. (In particular, it may be able to make an attempt to perform blind decoding on 3 types of RB level candidates and 2 types of symbol level candidates.) FIG. 9 (b) can be replaced with FIG. 6 (b).

Embodiment 3

Figure 10:
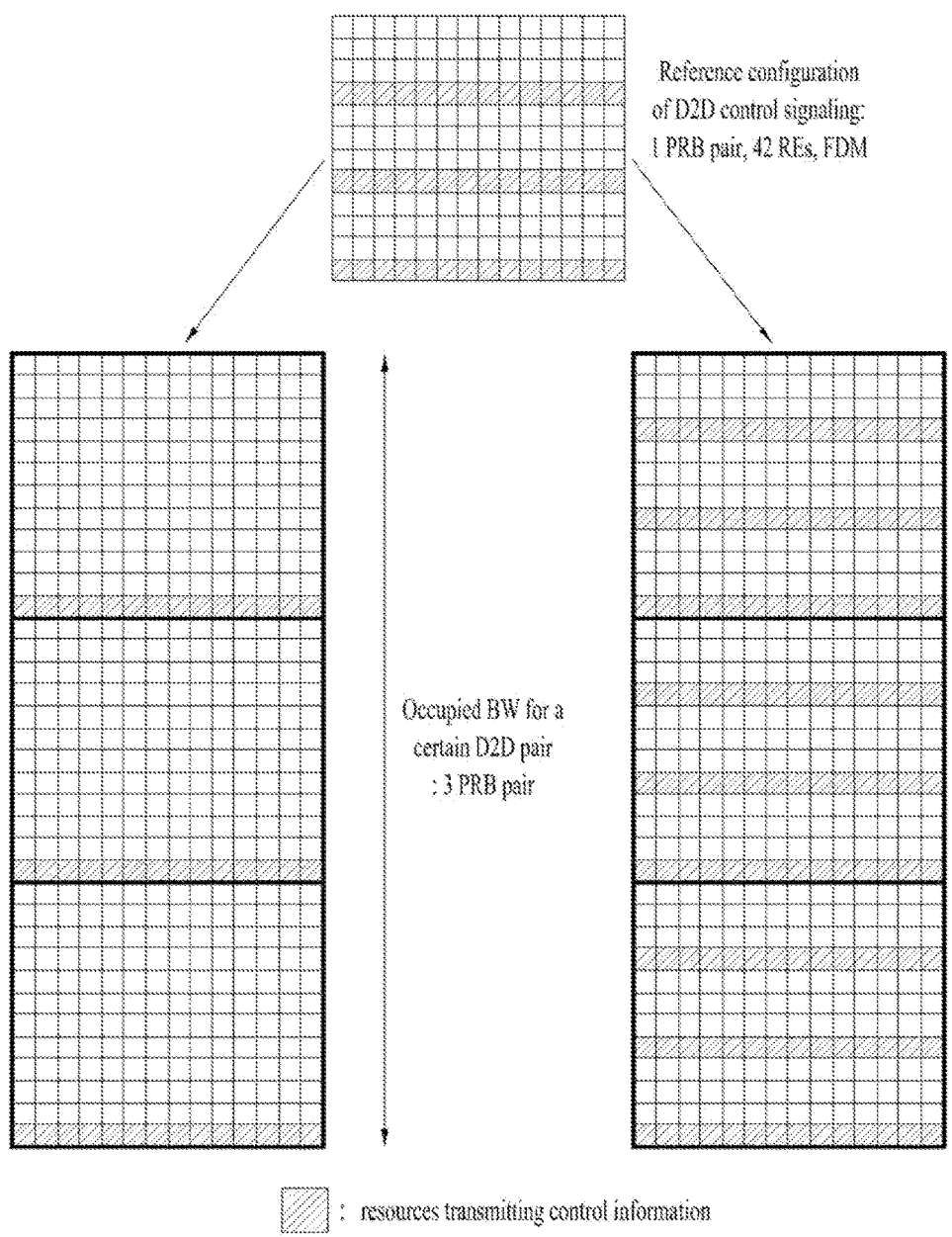

A base station or a cluster head UE defines a reference configuration for control signal transmission (the reference configuration can be defined an advance) and the reference configuration can be signaled to devices capable of performing D2D or recognized by the devices in advance. For example, the base station or the header UE can deliver a control signal reference signal used in a cell/cluster to the devices via common signaling (or UE-specific signaling). The reference configuration can be used for the usage of defining control signal overhead necessary for a single D2D pair. Or, the reference configuration may correspond to overhead of a control signal per total resources. For example, as shown in FIG. 10, the reference configuration can be defined by overhead of 42 REs per 1 PRB pair. A resource to which a control signal is mapped may vary based on a bandwidth (i.e., resources allocated to a specific D2D pair for the usage of D2D communication, D2D occupied bandwidth) on which D2D communication is actually performed. As shown in FIG. 10, a reference resource can be applied by two schemes. As a first scheme, 42 REs (or 3 subcarriers) can be positioned at the D2D occupied bandwidth in a manner of being distributed. As a second scheme, a reference configuration may repeatedly show up in an allocated resource. In this case, control information on each reference resource can be interpreted as being different from each other or reducing a coding rate.

Embodiment 4

The number of RBs in which control information is transmitted and/or the number of REs in which control information is transmitted according to an RB can be determined in accordance with a D2D occupied bandwidth. In particular, in order to obtain frequency diversity gain, it may be able to use the different number of RBs and a different amount of resources, which are used for a control signal in each RB, according to the D2D occupied bandwidth to transmit a control signal. Specifically, the number of RBs in which a control signal is transmitted can be defined in advance according to each D2D occupied bandwidth and a resource (e.g., RE, subcarrier) used for a control signal in each RB can be determined based on the number of transmitted RBs. Table 1 in the following shows an example for the aforementioned configuration. Assume that 72 REs are necessary for transmitting a control signal in Table 1.

TABLE 1

| | D2D occupied bandwidth | | | | | |
| --- | --- | --- | --- | --- | --- | --- |
| | 1 RBs | 5 RBs | 10 RBs | 18 RBs | 24 RBs | 36 RBs |
| # of RBs for control signal | 1 | 2 | 3 | 6 | 8 (6) | 12 (6) |
| # of REs per RB for control signal | 72 | 36 | 24 | 12 | 9 (12) | 6 (12) |

In Table 1, D2D occupied bandwidths 1, 5, 10, 18, 24 and 36 RBs correspond to threshold values. If the D2D occupied bandwidth corresponds to 2 to 5 RBs, 6 to 10 RBs and 11 to 18 RBs, it indicates that 2 RBs, 3 RBs and 6 RBs are used for transmitting a control signal, respectively. This can also be interpreted as the number of RBs transmitting a control signal changes according to a D2D occupied bandwidth (according to a predetermined rule) and the number of REs used for transmitting a control signal in a single RB is determined according to the number of each RB when a same length of a control signal is assumed. And, if a D2D occupied bandwidth is greater than a specific threshold value (e.g., 18 RBs), an increase of a frequency diversity gain can be saturated. In this case, in order to lower complexity of a UE, it may not increase the number of RBs in which a control signal is transmitted anymore. In Table 1, a number in parenthesis corresponds to a value to which the aforementioned configuration is reflected.

Embodiment 5

A position of an RB used for a D2D control signal may change according to a D2D occupied bandwidth. This can be applied to both a case of varying the number of RBs used for a control signal according to the D2D occupied bandwidth and a case of fixing the number of RBs used for a control signal irrespective of the D2D occupied bandwidth.

Figure 11:
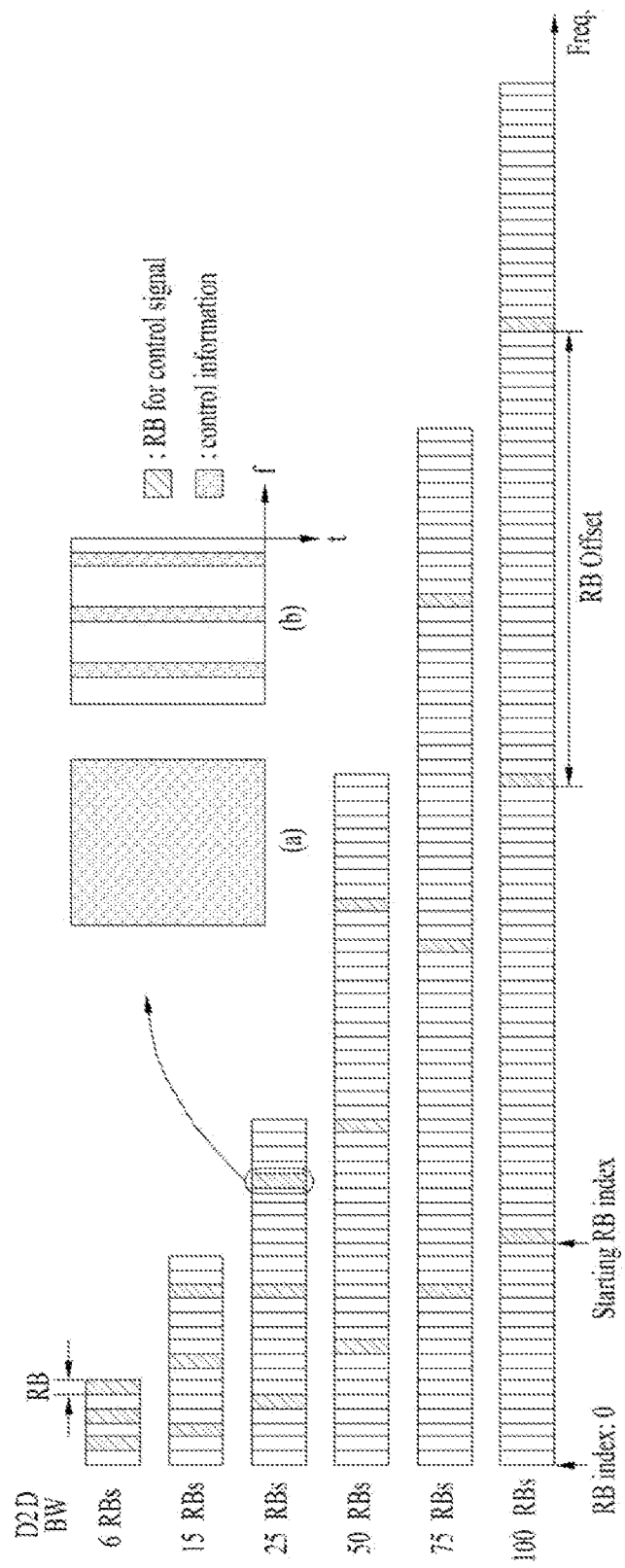

FIG. 11 shows an example of changing a position of an RB in which a control signal is transmitted according to a D2D occupied bandwidth. In FIG. 11, it is assumed that the number of RBs in which a control signal is transmitted corresponds to 3. The number of RBs can be determined by a fixed number or can be determined according to a D2D occupied bandwidth. RB arrangement shown in FIG. 11 can be determined by Equation 1 in the following.

$$Y_i = \left\lfloor \frac{M}{N} \right\rfloor i + \left\lfloor \frac{M}{2N} \right\rfloor \quad \text{[Equation 1]}$$

In this case, M corresponds to the number of RBs configuring the D2D occupied bandwidth, N corresponds to the number of RBs in which control information is transmitted, i=0, . . . , N−1, and Yi corresponds to an RB index. In the Equation above, $$\left\lfloor \frac{M}{2N} \right\rfloor$$

indicates a start position of an RB that transmits a control signal. This can be replaced in a manner of being associated with an ID of a D2D pair (dTUE, dRUE), a sequence number of a discovery signal or the like. And, $$\left\lfloor \frac{M}{N} \right\rfloor$$

indicates an offset between RBs in which a control signal is transmitted. If the $$\left\lfloor \frac{M}{N} \right\rfloor$$

is set to 1 (This can be indicated by upper layer signaling (or physical layer signaling) signaled by a base station or a cluster head or can be indicated by pre-signaling signaled by a dTUE), it is able to configure RBs transmitting a control signal to be contiguously positioned. Equation 1 can also be applied to a control signal in subcarrier unit with a same scheme.

FIG. 11 (a) shows a case that a control signal is mapped to the whole of RBs and FIG. 11 (b) shows a case that a control signal is transmitted on a specific subcarrier in an RB. (In FIGS. 11 (a) and (b), rate matching can be performed on a region to which a different signal such as a reference signal and the like is transmitted.) In case of FIG. 11 (a), resources more than necessary can be allocated for a control signal. A subcarrier on which a control signal is transmitted can be defined in advance in an RB in which the control signal is transmitted. Or, the subcarrier can be determined by Equation 1. For example, if a control signal is transmitted on 3 subcarriers in a specific RB, it may be able to use a start subcarrier index=2 and a subcarrier offset=4 in a manner of putting M=12 and N=3 in Equation 1. FIG. 11 (b) can be replaced with allocation in an OFDM symbol unit.

Embodiment 6

A position of an RE in which a control signal is transmitted can be determined according to the number of REs in which the control signal is transmitted. In this case, the number of REs in which the control signal is transmitted can be determined by a D2D occupied bandwidth. In particular, if a mapping position of a control signal for the specific number of REs is set in advance, the number of RBs in which a control signal is transmitted and the number of REs in an RB are determined according to the D2D occupied bandwidth, it is able to configure a control signal RE set matched with the number of REs in a manner of combining predetermined RE sets with each other. In this case, as shown in an example of FIG. 12, an RE set can be defined in advance. If the number of REs per RE in which a control signal is transmitted does not correspond any RE set among predetermined RE sets shown in FIG. 12, it may be able to use two or more RE sets in a manner of being combined. In this case, a position of the combined RE set should not be overlapped with a position of the RE in which the control signal is transmitted. If the combination of RE sets does not correspond to the number of REs, it may be able to designate REs as many as the number of deficient REs according to an order of arrows shown in FIG. 12 (g).

Figure 12:
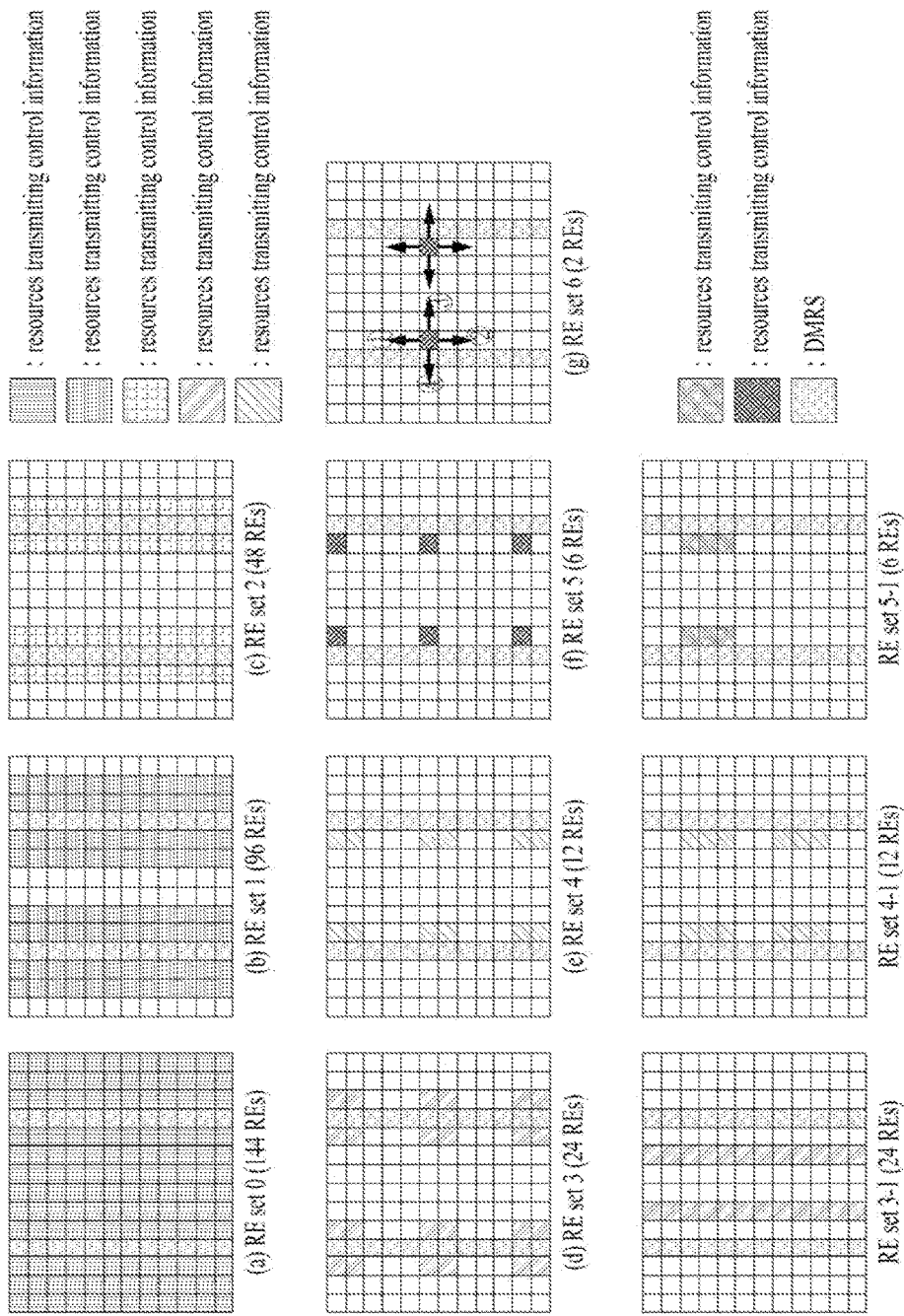

In a D2D operation, a UE receiving a control signal induces the number and positions of RBs in which a control signal is transmitted and the number of REs used for transmitting a control signal in a corresponding RB based on a D2D occupied bandwidth found by a discovery process or a D2D occupied bandwidth indicated by a base station (or a cluster head) and may be able to identify a position of a corresponding RE using the RE sets shown in FIG. 12. Each number of FIG. 12 (g) may correspond to 'searching priority'. It is able to find out an available RE in such an order as (first direction), (second direction), or (first and second direction after moving 1 RE in third direction). For example, if the number of REs transmitting a control signal per RB, which is derived from a D2D occupied bandwidth, corresponds to 22, it is able to secure 18 REs in a manner of combining an RE set 4 and an RE set 5-1 with each other and obtain an available RE in a manner of moving an RE set 6. Since it is unable to find out an available RE in first direction of FIG. 12 (g) with the combination of the RE set 4 and the Re set 5-1, it is able to secure 4 REs in a manner of moving in second direction and may be able to assume that a control signal is transmitted to 22 REs deducted from the aforementioned process. As a result, a control signal can be transmitted to a position shown in FIG. 13.

Embodiment 7

Figures 13, 14:
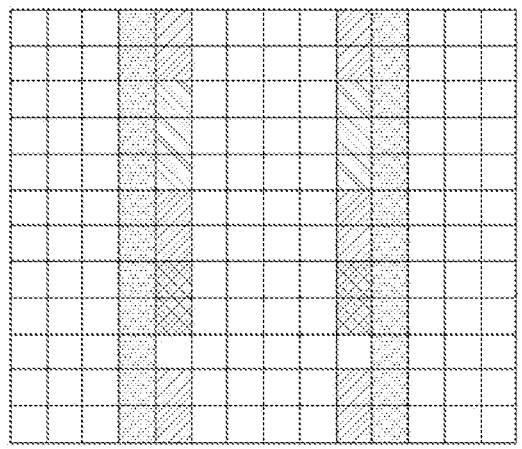

A position of an RE in which a control signal is transmitted can be determined by an index assigned to the RE in an RB. For example, REs in an RB can be indexed as shown in FIG. 14. If the number of REs in which a control signal is transmitted per RB is determined, it may be able to use REs as many as the number of determined REs from an RE of a lowest index. For example, if the number of REs corresponds to 36, shaded REs in FIG. 14 can be used for transmitting a control signal.

Although FIG. 14 assumes that each RE set includes 4 REs, it is also able to support 1, 2 and 8 granularity according to a size of an RE used for a control signal. (If granularity corresponds to 1, an index number 1 to 144 can be given to each RE except an RS. Indexes corresponding to the number of REs necessary for a corresponding RB can be used for transmitting a control signal. In this case, if a low index of high priority is arranged near an RS, it is able to improve channel estimation performance.)

The aforementioned embodiments can be used in an independent form or a combined form. For example, embodiment 4 to embodiment 7 can be used in the combined form. In this case, a resource region in which control information is transmitted can be determined as follows. The number of RBs in which the control information is transmitted and the number of REs in which the control information is transmitted in an RB can be determined based on a D2D occupied bandwidth. A position of an RB in which the control information is transmitted and a position of an RE in which the control information is transmitted can be determined on the D2D occupied bandwidth. In this case, the position of the RB in which the control information is transmitted can be determined by the embodiment 5. And, the position of the RE in which the control information is transmitted can be determined by either the embodiment of 6 or the embodiment 7. Yet, an example of the combination may be non-limited by the aforementioned example. It is able to combine various embodiments with each other.

The D2D occupied bandwidth can be signaled from one of a base station and a cluster head UE or can be found out from a discovery signal.

If a D2D operation is restricted by a base station within cell coverage, the aforementioned descriptions can be applied to a system bandwidth of the cell or a resource allocated by a base station. In case of a D2D operation performed at the outside of coverage, a resource is allocated by a D2D cluster header, a UE transmitting a discovery signal (or synchronization signal) for the D2D operation delivers time/frequency region in which the D2D operation is performed, and corresponding contents (contents on resource allocation) can be included in the discovery signal (or synchronization signal). For example, the discovery signal is delivered (or is transmitted to a random position in a prescribed region) via a PRB pair (e.g., center 6 PRB pairs) in the vicinity of a carrier frequency. If the discovery signal is delivered in a sequence form, it is able to deliver a channel bandwidth of a D2D operation and a time/frequency resource to a target UE in a manner of interlocking a sequence number and a D2D channel bandwidth with each other. For example, if a bandwidth used in the D2D operation is identical to a bandwidth of LTE system (i.e., 6 RBs, 15 RBs, 25 RBs, 50 RBs, 75 RBs and 100 RBs), a UE transmitting a discovery signal can generate a signal in a manner of interlocking a sequence number of the discovery signal (or synchronization signal), a bandwidth of the D2D operation, and a time/frequency resource with each other (e.g., sequence number 6n=1.4 MHz, 6n+1=3 MHz, . . . , 6n+5=20 MHz). Or, if a discovery signal is transmitted in a payload form (in particular, if the discovery signal is transmitted in a manner of including control information (information for D2D operation)), it is able to inform a target UE of a bandwidth on which the D2D operation is performed and a time/frequency resource in a manner of including the bandwidth and the resource in the discovery signal.

The aforementioned control signal configuration is defined in advance, is delivered to each device capable of performing D2D by a base station or a cluster head or is defined in a manner of being interlocked with a discovery signal transmitted by a UE that performs D2D transmission. For example, a D2D reception device can deliver one or a combination of i) a D2D BW (i.e., D2D occupied bandwidth) on which a corresponding UE performs a D2D operation, ii) a frequency resource (e.g., RB (set), subcarrier (set)) on which a control signal is transmitted in the D2D BW or frequency domain candidates (pattern), iii) time resource (e.g., OFDM symbol (set), subframe (set)) in which a control signal is transmitted in corresponding D2D time interval, and time domain candidates (pattern) to a D2D pair via (predetermined) signaling or information interlocked with the discovery signal.

Device Configuration According to Embodiment of the Present Invention

Figure 15:
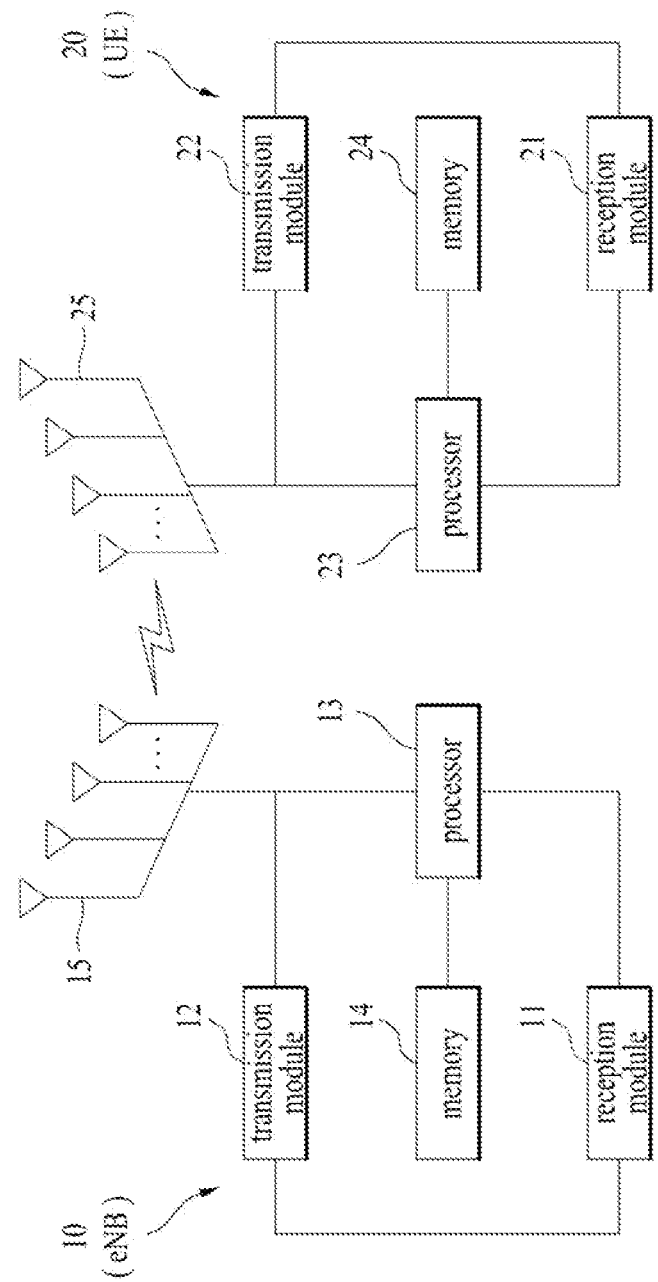
FIG. 15 is a diagram for configuration of a transceiver.

FIG. 15 is a diagram for configuration of a transmit point apparatus and a user equipment according to embodiment of the present invention.

Referring to FIG. 15, a transmit point apparatus 10 may include a receive module 11, a transmit module 12, a processor 13, a memory 14, and a plurality of antennas 15. The antennas 15 represent the transmit point apparatus that supports MIMO transmission and reception. The receive module 11 may receive various signals, data and information from a UE on an uplink. The transmit module 12 may transmit various signals, data and information to a UE on a downlink. The processor 13 may control overall operation of the transmit point apparatus 10.

The processor 13 of the transmit point apparatus 10 according to one embodiment of the present invention may perform processes necessary for the embodiments described above.

Additionally, the processor 13 of the transmit point apparatus 10 may function to operationally process information received by the transmit point apparatus 10 or information to be transmitted from the transmit point apparatus 10, and the memory 14, which may be replaced with an element such as a buffer (not shown), may store the processed information for a predetermined time.

Referring to FIG. 15, a UE 20 may include a receive module 21, a transmit module 22, a processor 23, a memory 24, and a plurality of antennas 25. The antennas 25 represent the UE that supports MIMO transmission and reception. The receive module 21 may receive various signals, data and information from an eNB on a downlink. The transmit module 22 may transmit various signals, data and information to an eNB on an uplink. The processor 23 may control overall operation of the UE 20.

The processor 23 of the UE 20 according to one embodiment of the present invention may perform processes necessary for the embodiments described above.

Additionally, the processor 23 of the UE 20 may function to operationally process information received by the UE 20 or information to be transmitted from the UE 20, and the memory 24, which may be replaced with an element such as a buffer (not shown), may store the processed information for a predetermined time.

The configurations of the transmit point apparatus and the UE as described above may be implemented such that the above-described embodiments can be independently applied or two or more thereof can be simultaneously applied, and description of redundant parts is omitted for clarity.

Description of the transmit point apparatus 10 in FIG. 15 may be equally applied to a relay as a downlink transmitter or an uplink receiver, and description of the UE 20 may be equally applied to a relay as a downlink receiver or an uplink transmitter.

The embodiments of the present invention may be implemented through various means, for example, hardware, firmware, software, or a combination thereof.

When implemented as hardware, a method according to embodiments of the present invention may be embodied as one or more application specific integrated circuits (ASICs), one or more digital signal processors (DSPs), one or more digital signal processing devices (DSPDs), one or more programmable logic devices (PLDs), one or more field programmable gate arrays (FPGAs), a processor, a controller, a microcontroller, a microprocessor, etc.

When implemented as firmware or software, a method according to embodiments of the present invention may be embodied as a module, a procedure, or a function that performs the functions or operations described above. Software code may be stored in a memory unit and executed by a processor. The memory unit is located at the interior or exterior of the processor and may transmit and receive data to and from the processor via various known means.

Preferred embodiments of the present invention have been described in detail above to allow those skilled in the art to implement and practice the present invention. Although the preferred embodiments of the present invention have been described above, those skilled in the art will appreciate that various modifications and variations can be made in the present invention without departing from the spirit or scope of the invention. For example, those skilled in the art may use a combination of elements set forth in the above-described embodiments. Thus, the present invention is not intended to be limited to the embodiments described herein, but is intended to accord with the widest scope corresponding to the principles and novel features disclosed herein.

The present invention may be carried out in other specific ways than those set forth herein without departing from the spirit and essential characteristics of the present invention. Therefore, the above embodiments should be construed in all aspects as illustrative and not restrictive. The scope of the invention should be determined by the appended claims and their legal equivalents, and all changes coming within the meaning and equivalency range of the appended claims are intended to be embraced therein. The present invention is not intended to be limited to the embodiments described herein, but is intended to accord with the widest scope consistent with the principles and novel features disclosed herein. In addition, claims that are not explicitly cited in each other in the appended claims may be presented in combination as an embodiment of the present invention or included as a new claim by subsequent amendment after the application is filed.

INDUSTRIAL APPLICABILITY

Embodiments of the present invention are applicable to various mobile communication systems.

What is claimed is:

1. A method of obtaining control information by a D2D (device-to-device) user equipment in a wireless communication system, the method comprising:
    determining a resource region in which the control information is transmitted based on a D2D occupied bandwidth;
    and
    obtaining the control information in the determined resource region,
    wherein determining the resource region in which the control information is transmitted comprises:
        determining a number of resource blocks (RBs) in which the control information is transmitted based on the D2D occupied bandwidth;
        determining a number of resource elements (REs) in which the control information is transmitted in an RB based on the D2D occupied bandwidth;
        determining a position of an RB in which the control information is transmitted based on the D2D occupied bandwidth; and
        determining a position of the RE in which the control information is transmitted in the RB based on the D2D occupied bandwidth,
    wherein the position of the RB in which the control information is transmitted is repeated within the D2D occupied bandwidth from a specific RB position at a specific interval,
    wherein the specific RB position corresponds to a first quotient obtained by dividing a number of RBs configuring the D2D occupied bandwidth by the transmitted, and
    wherein the specific interval corresponds to a second quotient obtained by dividing the number of RBs configuring the D2D occupied bandwidth by twice the determined number of RBs in which the control information is transmitted.

2. The method claim 1, wherein the position of the RB in which the control information is transmitted is determined based on the number of RBs configuring the D2D occupied bandwidth and the determined number of RBs in which the control information is transmitted.

3. The method of claim 2, wherein the position of the RB in which the control information is transmitted is further determined based on the following equation:

$$Y_i = \left\lfloor \frac{M}{N} \right\rfloor i + \left\lfloor \frac{M}{2N} \right\rfloor$$

wherein M corresponds to the number of RBs configuring the D2D occupied bandwidth,
    wherein N corresponds to the determined number of RBs in which the control information is transmitted, and
    wherein i=0, . . . , N−1.

4. The method of claim 1, wherein the position of the RE in which the control information is transmitted is determined based on the determined number of REs in which the control information is transmitted.

5. The method of claim 4, wherein the position of the RE in which the control information is transmitted is further determined in advance in an RB of an RE set corresponding to the determined number of REs in which the control information is transmitted.

6. The method of claim 5, wherein the position of the RE in which the control information is transmitted is further determined by a combination of at least two RE sets if there is no RE set corresponding to the determined number of REs in which the control information is transmitted.

7. The method of claim 6, wherein the determined position of the RE in which the control information is transmitted does not overlap in the at least two or more RE sets.

8. The method of claim 1, wherein the D2D occupied bandwidth is signaled by a base station or a cluster head user equipment.

9. A D2D (device-to-device) user equipment (UE) in a wireless communication system, the UE comprising:
a reception module configured to receive information; and
a processor configured to:
determine a resource region in which control information is transmitted; and
obtain the control information in the determined resource region based on a D2D occupied bandwidth,
wherein determining the resource region in which the control information is transmitted comprises:
determining a number of resource blocks (RBs) in which the control information is transmitted based on the D2D occupied bandwidth;
determining a number of resource elements (REs) in which the control information is transmitted in an RB based on the D2D occupied bandwidth;
determining a position of an RB in which the control information is transmitted based on the D2D occupied bandwidth; and
determining a position of the RE in which the control information is transmitted in the RB based on the D2D occupied bandwidth,
wherein the position of the RB in which the control information is transmitted is repeated within the D2D occupied bandwidth from a specific RB position at a specific interval,
wherein the specific RB position corresponds to a first quotient obtained by dividing a number of RBs configuring the D2D occupied bandwidth by the determined number of RBs in which the control information is transmitted, and
wherein the specific interval corresponds to a second quotient obtained by dividing the number of RBs configuring the D2D occupied bandwidth by twice the determined number of RBs in which the control information is transmitted.

10. The method claim 9, wherein the position of the RB in which the control information is transmitted is determined based on the number of RBs configuring the D2D occupied bandwidth and the determined number of RBs in which the control information is transmitted.

11. The UE of claim 10, wherein the position of the RB in which the control information is transmitted is further determined based on the following equation:

$$Y_i = \left\lfloor \frac{M}{N} \right\rfloor i + \left\lfloor \frac{M}{2N} \right\rfloor$$

wherein M corresponds to the determined number of RBs configuring the D2D occupied bandwidth,
wherein N corresponds to the number of RBs in which the control information is transmitted, and
wherein $i=0, \ldots, N-1$.

12. The UE of claim 9, wherein the position of the RE in which the control information is transmitted is determined based on the determined number of REs in which the control information is transmitted.

13. The UE of claim 12, wherein the position of the RE in which the control information is transmitted is further determined in advance in an RB of an RE set corresponding to the determined number of REs in which the control information is transmitted.

14. The UE of claim 13, wherein the position of the RE in which the control information is transmitted is further determined by a combination of at least two RE sets if there is no RE set corresponding to the determined number of REs in which the control information is transmitted.

15. The UE of claim 14, wherein the determined position of the RE in which the control information is transmitted does not overlap in the at least two RE sets.

16. The UE of claim 9, wherein the D2D occupied bandwidth is signaled by a base station or a cluster head user equipment.

* * * * *